(12) United States Patent
Bose et al.

(10) Patent No.: US 7,818,696 B2
(45) Date of Patent: Oct. 19, 2010

(54) ARCHITECTURAL LEVEL THROUGHPUT BASED POWER MODELING METHODOLOGY AND APPARATUS FOR PERVASIVELY CLOCK-GATED PROCESSOR CORES

(75) Inventors: Pradip Bose, Yorktown Heights, NY (US); Tejas S. Karkhanis, Madison, WI (US); Srinivasan Ramani, Cary, NC (US); Malcolm Scott Ware, Austin, TX (US); Ken Vu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 11/780,712

(22) Filed: Jul. 20, 2007

(65) Prior Publication Data

US 2008/0027664 A1 Jan. 31, 2008

Related U.S. Application Data

(62) Division of application No. 10/960,730, filed on Oct. 7, 2004, now Pat. No. 7,249,331.

(51) Int. Cl.
*G06F 17/50* (2006.01)
(52) U.S. Cl. .............................................. 716/4; 716/5
(58) Field of Classification Search .................. 716/1–5
See application file for complete search history.

(56) References Cited

U.S. PATENT DOCUMENTS 6,871,172 B1 * 3/2005 Sanders ........................ 703/14
2004/0172519 A1 * 9/2004 Nakajima .................... 712/209

* cited by examiner

*Primary Examiner*—Paul Dinh
(74) *Attorney, Agent, or Firm*—F. Chau & Associates, LLC

(57) ABSTRACT

A method for estimating power dissipated by a processor core processing a workload-includes analyzing a reference test case to generate a reference workload characteristic, analyzing an actual workload to generate an actual workload characteristic, performing a power analysis for the reference test case to establish a reference power dissipation value and estimating an actual workload power dissipation value responsive to the actual and reference workload characteristics and the reference power dissipation value.

4 Claims, 5 Drawing Sheets

ARCHITECTURAL LEVEL THROUGHPUT BASED POWER MODELING METHODOLOGY AND APPARATUS FOR PERVASIVELY CLOCK-GATED PROCESSOR CORES

CROSS-REFERENCE TO RELATED APPLICATION

This is a Divisional Application of U.S. application Ser. No. 10/960,730 filed on Oct. 7, 2004, now U.S. Pat. No. 7,249,331 the disclosure of which is herein incorporated by reference in its entirety.

BACKGROUND OF INVENTION

1. Technical Field

The present invention relates to estimating power consumption in processor cores, and more particularly, to estimating power consumption when processing different workloads.

2. Discussion of the Related Art

There are a number of ways of estimating power consumption in processor cores executing different workloads. Existing solutions range from carrying out power analysis at the architecture level, which is less accurate, to detailed analysis at the gate/circuit level, which is more, accurate, but complex and time consuming.

Architecture level power analysis tools use simulators that can run various workloads relatively quickly. Nevertheless, these tools rely on estimates for power in different parts of the processor core (either based on guesses, approximations, or from detailed analysis of gate/circuit level implementation) to put together an overall power estimate. For many processor cores, however, the various parts that make up the core cannot be easily broken down into independent units for which detailed power characterization can be obtained.

Gate/circuit level analysis requires detailed gate level or circuit level simulations, using a power analysis tool for each workload of interest. Examples of such power simulators are PowerTheater® from Sequence Design, Inc. that can do power analysis at the gate level, or PowerMill® (now known as NanoSim®) from Synopsys, Inc. and PowerSpice® that can do power analysis at the circuit level. These existing solutions are time consuming. They need to be rerun for every new workload. More seriously, they are not feasible for use with long-running workloads, either because the analysis takes very long to finish or because the tools fail during such long simulations due to the complexity of the analysis. Thus, such tools are useful only for relatively small code sequences, generally no more than several hundred instructions, which may be just a small part of the entire workload. These limitations make such power analysis tools unattractive for making quick power estimations for various workloads.

Therefore, there is the need for a methodology that will allow power comparisons to be done quickly for different workloads. This methodology also needs to be applicable to processor cores that cannot be broken into units for individual power analysis, for use with existing architecture level power analysis methodologies.

SUMMARY

An exemplary embodiment of the present invention includes a method of estimating the power dissipated by a processor core processing an actual workload. The method comprises analyzing a reference test case to generate a reference workload characteristic. Analyzing the actual workload to generate an actual workload characteristic. Performing a power analysis for the reference test case to establish a reference power dissipation value. Estimating an actual workload power dissipation value responsive to the actual and reference workload characteristics and the reference power dissipation value.

Another exemplary embodiment of the present invention includes an improved microarchitecture performance simulator for a processor core having a method to calculate performance data for a simulated processor core processing an actual workload. The improvement comprises a reference test case analyzer for generating a reference workload characteristic. An actual workload analyzer for generating an actual workload characteristic. A power analyzer for performing a power analysis of the reference test case to establish a reference power dissipation value. An actual workload power analyzer for estimating a power dissipation value responsive to the actual and reference workload characteristics and the reference power dissipation value.

Another exemplary embodiment of the present invention includes an improved microarchitecture performance simulator as defined earlier, wherein the improvement further comprises a leakage power analyzer fur calculating a leakage power value for the processor core processing the new workload and a calculator for adding the leakage power value to the actual workload power dissipation value.

Another exemplary embodiment of the present invention includes a system for estimating the power dissipated by a processor core, processing an actual workload. The system comprises a workload component storage unit ("WCSU"), for storing a workload component capable of modeling at least part of a workload. A model input unit allowing for the choosing and connecting of a number of the workload components stored in the WCSU, for modeling of an actual workload. A calculation system for estimating an actual workload power dissipation value. An output unit for sending, the estimated actual workload power dissipation value to an external system.

Another exemplary embodiment of the present invention includes a system as described above further comprises a parameter input unit for the input of an operating parameter for a processor core.

Another exemplary embodiment of the present invention included a system as described above further comprises a parameter input unit for the input of an operating parameter for the actual workload.

Another exemplary embodiment of the present invention includes a program storage device readable by machine, tangibly embodying a program of instructions executable by the machine to perform method steps for estimating the power dissipated by a processor core processing an actual workload. The steps comprising analyzing a reference test case to generate a reference workload characteristic, analyzing the actual workload to generate an actual workload characteristic, performing a power analysis for the reference test case to establish a reference power dissipation value, and estimating an actual workload power dissipation value responsive to the actual and reference workload characteristics and the reference power dissipation value.

DETAILED DESCRIPTION OF PREFERRED EMBODIMENTS

An exemplary embodiment of the present invention projects or estimates power dissipated by one or more processor cores, while processing an actual workload. This estimation can be accomplished by establishing reference power numbers for the processor core in question. These reference power numbers can be established by performing a detailed power analysis for reference test cases. Power for any new workload, also known as actual workload herein, is projected by relating the reference power number to the performance characteristics of the actual workload and the reference runs.

The reference test cases, which are used to establish reference power, will be much smaller than the actual workloads that can be encountered in real deployments of the processor core. Hence, it will not be a problem for the analysis to complete without failures and in a reasonable time. The test cases will be chosen such that they cover the different architectural usage scenarios that actual workloads could exhibit. In contrast, if power has to be projected using one of the existing approaches, it will require the simulation and power analysis of ever new workload in question using current tools. As mentioned above, this is not only time consuming, but also may not be practical for very long workloads.

Figure 1:
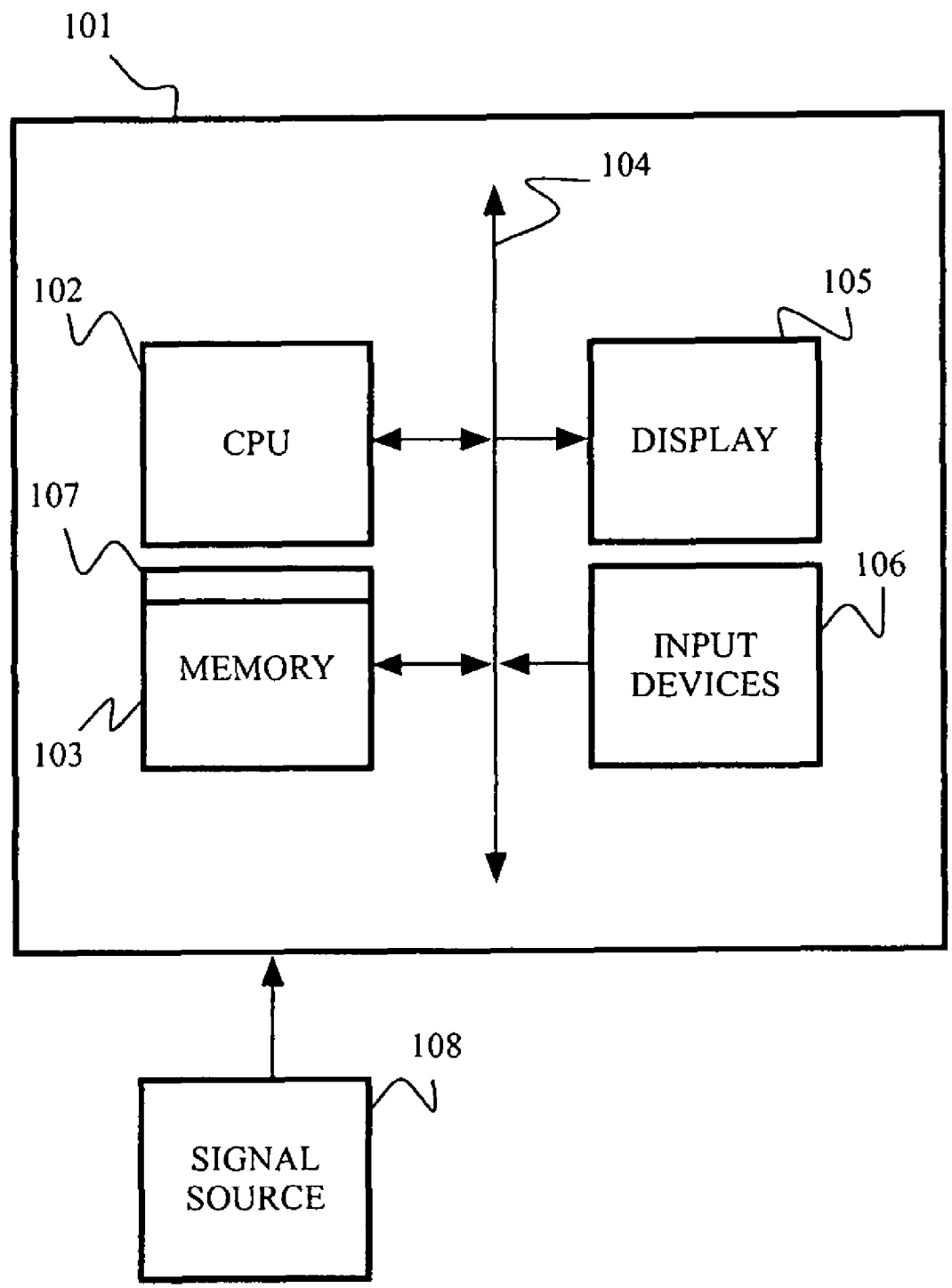
FIG. 1 is a schematic diagram illustrating an exemplary embodiment of a computer system.

Referring to FIG. 1, according to an exemplary embodiment of the present invention, a computer system 101 for implementing the present invention includes a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer platform 101 also includes an operating system and microinstruction code. The various processes and functions described herein may either be part of the microinstruction code or part of the application program (or a combination thereof), which is executed via the operating system. In addition, various other peripheral devices may be connected to the computer platform, such as an additional data storage device and a printing device.

Figure 2:
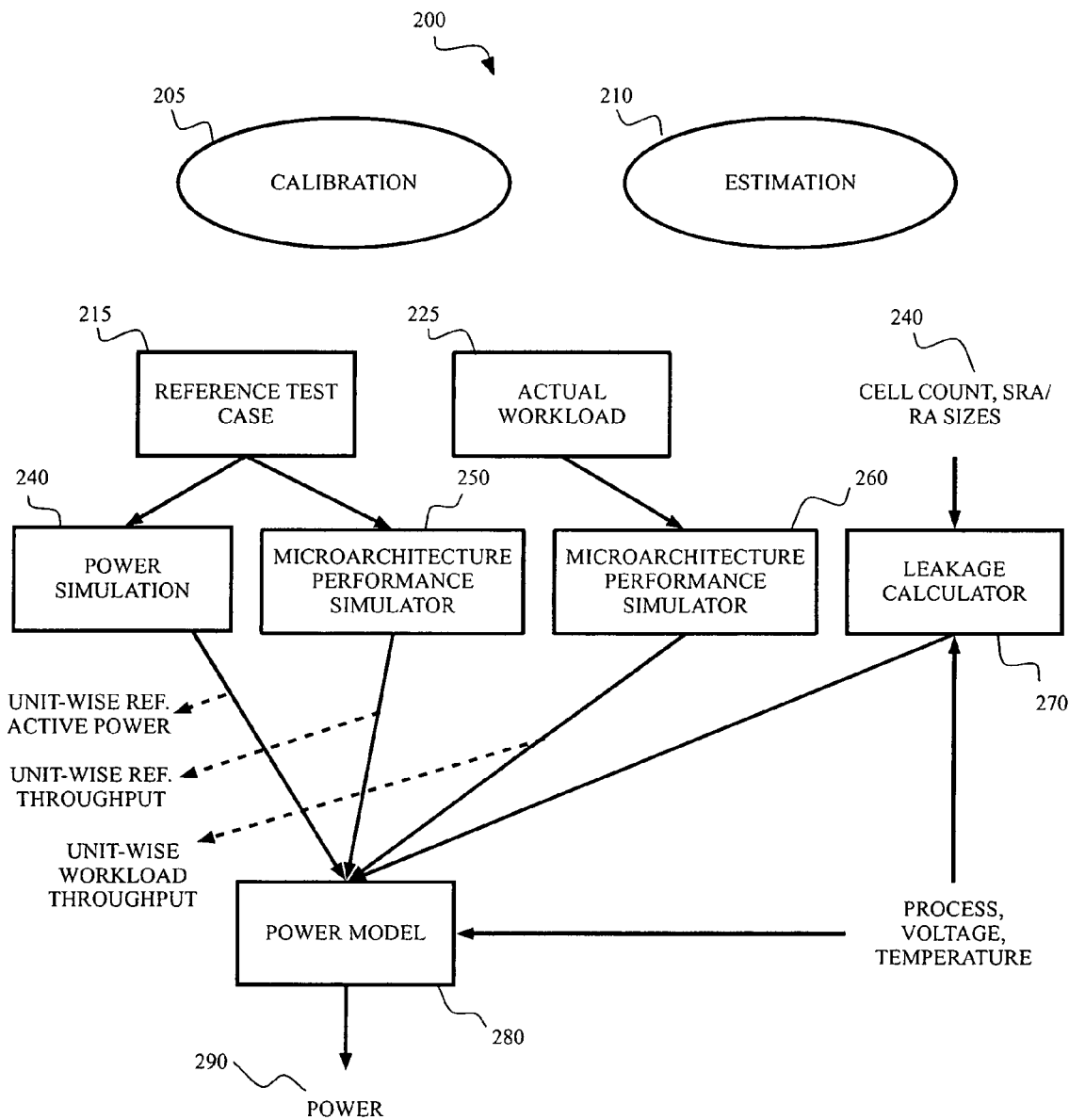
FIG. 2 is a schematic diagram illustrating an exemplary embodiment of the present invention.

FIG. 2 depicts an exemplary embodiment of a hybrid power modeling methodology that that is in accordance with the present invention, indicated generally by the reference numeral 200. It has both the relative speed of architecture level power modeling approaches and the accuracy close to that of gate/circuit level approaches.

An exemplary embodiment of the methodology depicted in FIG. 2 works as follows. One or more reference test cases 215 are simulated on a tool, also known as a power simulator herein, that does power analysis 240 at the gate/circuit level, recording dynamic power dissipated in various units within one or more processor cores. One of many such tools that can be used is PowerMille. To complete establishment of a reference for power, the same reference test cases 215 are simulated on a microarchitecture performance simulator 250 for the processor core under study. Architecture level performance data, or other type of workload characteristics, are collected. These workload characteristics include, but are not limited to, instructions per cycle ("IPC") in different units, number of cache accesses per cycle, and number of register accesses. The dynamic power information and the reference workload characteristic data are used as calibration inputs for an analytical model. An actual workload of interest 225, for which power has to be estimated, is simulated in the microarchitecture performance simulator for the processor core. The same workload characteristics, as collected for the reference test cases, are collected again for the actual workload, i.e., IPC in different units, number of cache and register accesses per cycle. These actual workload characteristics are then fed into the analytical model that has previously been calibrated, using the reference test cases that model the actual workload, to get the dynamitic power for the actual workload.

In an exemplary embodiment of the present invention depicted in FIG. 2, existing power and performance analysis tools are used to create a new hybrid power modeling methodology that involves two distinct phases. The two phases are indicated under the ovals labeled "Calibration" 205 and "Estimation" 210. The blocks labeled "Power Simulator" 240, "Microarchitecture Performance Simulator" 250 and 260, and "Leakage Calculator" 270 represent existing tools for power or performance modeling. The block labeled "Power model" 280 represents the equations that use the calibration data and performance analysis results for the actual workload under consideration, in conjunction to leakage power projections for the core to project power 290 for the workload.

A premise for an exemplary embodiment of the present inverention is that in pervasively, clock-gated designs, dynamic power for units in the processor core will be proportional to the IPC for that unit. Cache access power and register access power depend on the number of accesses to the cache arrays (separated into instruction and data to caches) and register arrays, respectively. The gate/circuit level power analysis for the reference runs can be used to establish the per access power for the caches and register arrays. Hence, once these access counts are known for a new workload or actual workload, from a microarchitecture performance simulation, the average cache and register power for the workload can be calculated. Leakage power can be computed using a variety of methods. These methods include spreadsheet models for the circuit technology and detailed analysis using available power simulation tools.

Another premise for embodiments of the invention is that in pervasively clock-gated designs, only the logic required to execute an instruction show switching activity, thus, unused logic does not consume dynamic, active or switching, power. Therefore, dynamic power is proportional to the throughput of the instructions in that unit. For illustration, consider that the processor core can be divided into the following units: floating, point unit, FPU; execution unit, EU; instruction unit, IU; and clock buffers, CLKBUFF. Power for unit k; $P_k$, can be derived by scaling the reference power number for the unit, $P_{REF\_k}$, of the appropriate reference test case by the ratio of the workload instruction throughput, $IPC_k$ and the reference instruction throughput, $IPC_{REF\_k}$ for the unit:

$$P_k = P_{REF\_k} \times (IPC_k / IPC_{REF\_k}), \tag{1}$$

where $k$ is one of $\{FPU, EU, IU, CLKBUFF\}$

Similarly, for estimating instruction and data cache array ("IS-ARRAY" and "DS-ARRAY" respectively) power, and register array ("REGARRAY") power, the reference power for the array is scaled by the ratio of the number of cache accesses per cycle for the new workload, accesses_per_cycle$_k$, to the number of cache accesses per cycle for the reference run, accesses_per_cycle$_{REF\_k}$ as indicated in the equation below:

$$P_k = P_{REF\_k} \times (\text{accesses\_per\_cycle}_k / \text{accesses\_per\_cycle}_{REF\_k}), \tag{2}$$

where $k$ is one of $\{I\$\text{-ARRAY}, D\$\text{-ARRAY}, REGARRAY\}$

Some units may not show much power variation with workload. For example, the memory management unit, MMU, may not show much variation if the workloads do not differ very significantly in the number of translation look aside buffer, TLB, accesses per cycle. The number of TLB accesses depends on the number of loads, stores, and instruction fetches that occur. This performance data can be obtained from the microarchitecture performance simulator. TLB power could also be influenced by the number of TLB misses that occur. If it is determinited that TLB accesses and misses per cycle are roughly the same for different workloads, an exemplary embodiment of the present invention can choose to consider dynamic power of the MMU as the same for different workloads. As another example, logic used to deal with cache misses are active only when there are cache misses, and the reference dynamic power for this logic should be scaled by the number of misses per cycle. Nevertheless, as for the MMU, if the workloads under consideration will not cause cache misses, the dynamic power numbers for these units can be kept the same for all the workloads. In addition, the built; in self-test, BIST, unit is not active during normal workload execution, and need not be scaled, ideally it should not dissipate any power while not in the BIST mode. Thus, for these units:

$$Pk = P_{REF\_k}, \tag{3}$$

where $k$ is one of $\{MMU, \text{logic to deal with cache miss}, BIST\}$

In an exemplary embodiment of the present invention reference test cases are designed to reflect the characteristics of the workloads they model; in principle, this process is like the process of designing benchmarks for workloads. Concurrently, as discussed earlier, the reference test case must not exceed a length that will cause a detailed power simulation to fail. For current power simulators this is approximately a couple hundred instructions. The statistics of instructions, found in typical benchmarks, can be used to construct the reference test case. A set of reference test cases can be designed and stored; a case from that set can be selected, based on the characteristics of the workload for which power is to be estimated. For example, a workload with no branch instructions may consume less power in the instruction unit, IU, than a workload with branch instructions. This could happen if the microarchitecture includes branch prediction logic in the instruction unit. To distinguish these two types of workloads, at least two reference runs are needed, one with a typical branch density and one without branches. When TLB misses and cache misses are common, reference runs for these scenarios need to be designed and reference power numbers for these scenarios need to be obtained. These reference power numbers are needed to project MMU and "cache miss logic" power for a new workload. Further variations in I/O power should also be considered, and may be as simple as keeping track of SDRAM accesses in the performance simulator when cache misses, DMA accesses, etc. happen.

Figure 3:
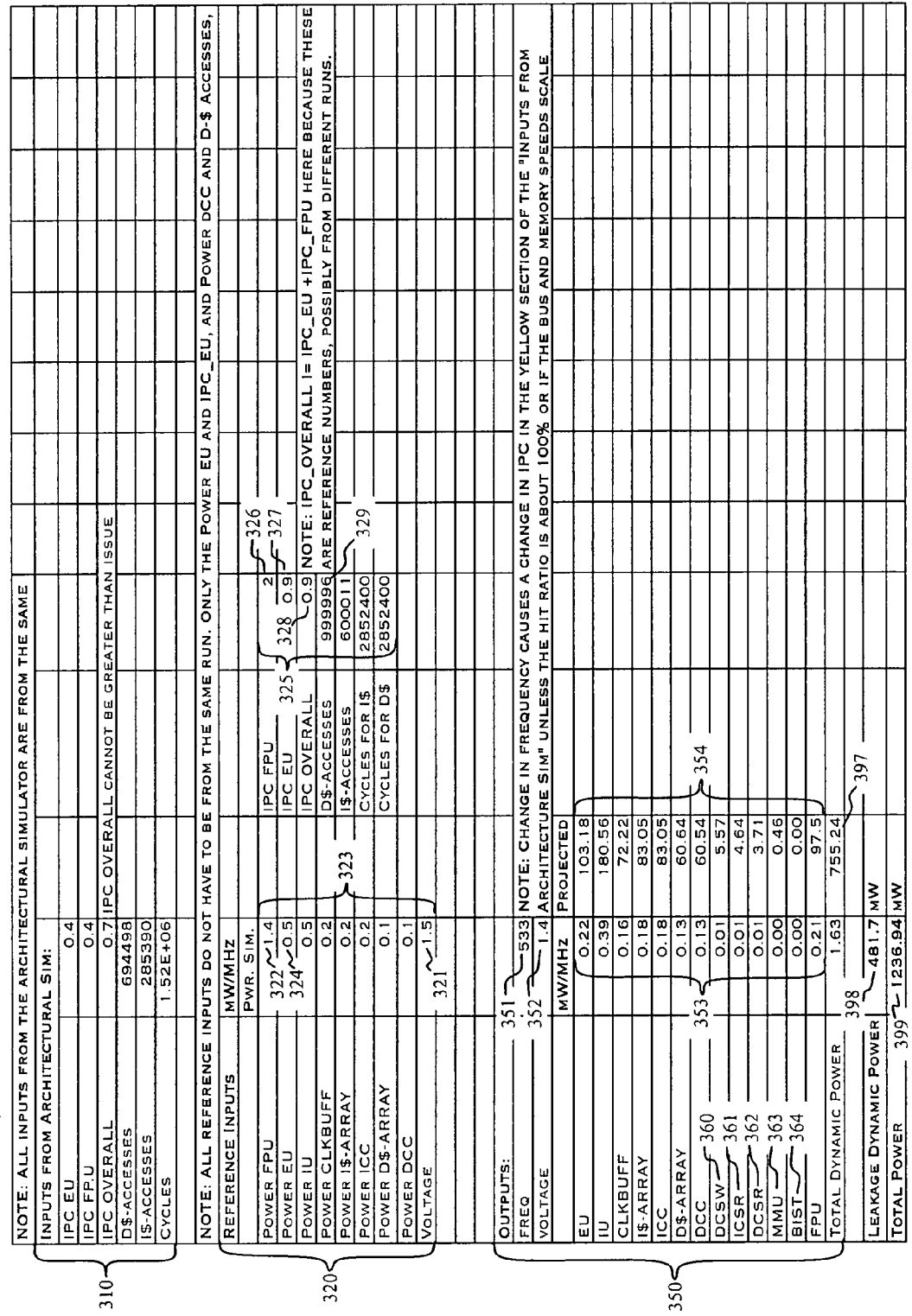
FIG. 3 is a spreadsheet illustrating, an exemplary embodiment of the present invention implemented as a spreadsheet.

FIG. 3 depicts an exemplary embodiment of the present invention. To compute power for various workloads under different process, temperature, and voltage combinations the methodology described herein has been implemented in a spreadsheet 300. The fields under "Inputs from Architectural Sim" section 310 show performance data for the actual workload in question, extracted from a microarchitecture performance simulator. Under the "Reference Inputs" section 320, in the "Pwr.Sim." column, are power numbers 323 for a reference run on a power simulator. Also shown under the "Reference Inputs" section 320 are performance characteristics 325 obtained from the micro architectural simulator for the reference run: IPC_FPU 326, IPC_EU 327, IPC_OVERALL 328, DS-accesses 329), and others.

The entries in FIG. 3 show that or the reference test case, the throughput at the execution unit of the processor core, IPC_EU, is achieved with dynamic power dissipation 324 of 0.5 mW/MHz, and is labeled as "Power EU" in the spreadsheet 300. Similarly, if the throughput in the FPU is two instructions per cycle 326 then according to the entries in FIG. 3, the dynamic power dissipated is 1.4 mW/MHz in the FPU 322. The "Voltage" label in the "Reference Inputs" section 320 is the voltage at which the reference code was simulated in the power simulator. In this case, it is specified as 1.5 V, in the cell identified by reference numeral 321.

The "Outputs" section 350 has two columns. The first column contains the mW/MHz power numbers 353 obtained by scaling the reference power numbers, as explained herein, by their respective scaling factors according to: IPC in each unit, number of accesses to caches, etc. The second column contains the power 354, dynamic power, dissipated by each unit. These values were calculated for a processor core running at the frequency defined in the cell labeled "freq" 351, 533 MHz, and at the voltage defined in cell labeled "voltage" 352, 1.4 V. Both of these values describe the operating conditions at which power projections are to be made, while analyzing the actual workload. Dynamic power at a desired frequency can be obtained by multiplying mW/MHz power numbers by the desired frequency. This is because dynamic power is directly proportional to frequency. To project dynamic power at a different voltage, i.e., the 1.4 V used for the actual workload verses the 1.5 volts used for the reference case, the $V^2$ scaling rule for dynamic power is used; that is, dynamic power is proportional to the square of the voltage, if the frequency and capacitances inside the processor core design are constant. Thus, the values in column one are multiplied by 533 MHz. and scaled by $1.4^2/1.5^2$ to get the values in column two 354. Note that in FIG. 3, power for the MMU 363, BIST 364, and logic for dealing with cache misses (DCSW 360, ICSR 361, DCSR 362) are taken to be invariant with workload. Hence, they are shown only in the "Outputs" section 350 of the spreadsheet 300. Finally, the dynamic power numbers for the units within the processor core 354 are added to create the "Total Dynamic Power" 397, which is then added to the "Leakage Power" 398 for the processor core to compute the "Total Power" 399.

In other exemplary embodiments of the present invention (not pictured) separate spreadsheets, or other systems, can be constructed when there are several workloads to be characterized for power. In each case, analysis could be required for multiple process corners, for example, for Best-Case and Worst-Case process corners, and for multiple voltage points.

In another exemplary embodiment (not pictured) the equations behind the methodology can easily be built into a microarchitecture performance simulator, or other systems, to perform seamless power projection for different workloads.

Figure 4:
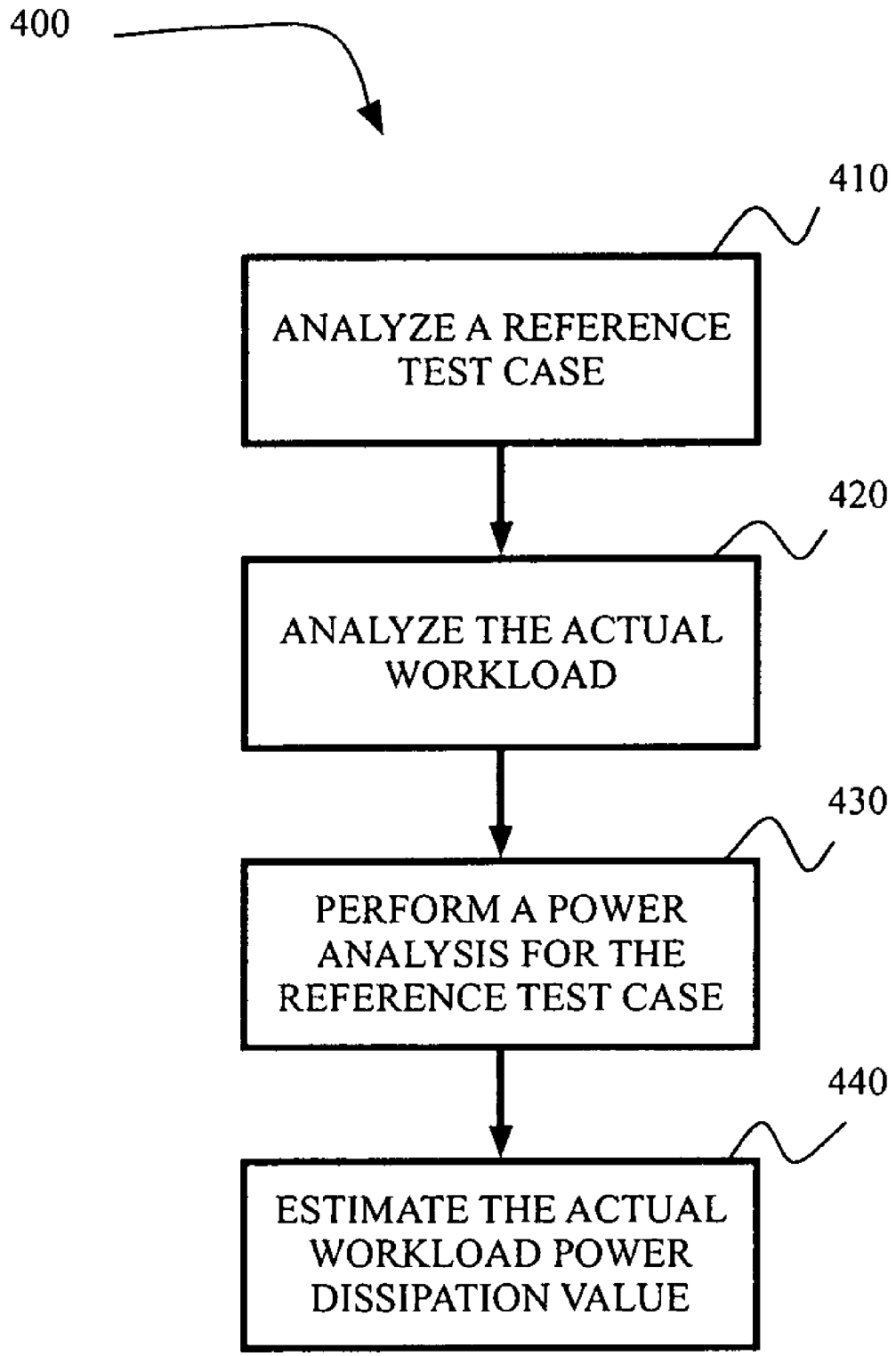
FIG. 4 is a flow diagram illustrating a power estimation process in accordance with an exemplary embodiment of the present invention.

FIG. 4 is a flow diagram depicting an exemplary embodiment of the present invention, indicated generally by the reference numeral 400. It depicts an example of a method to estimate the power dissipated by a processor core processing an actual workload. Block 410 depicts analyzing a reference test case that models an actual workload. This analysis can be done with a microarchitecture performance simulator or other tool that will return one or more workload characteristics, which represent a processor core's response to the reference test case. Thus, these workload characteristics are called reference workload characteristics. The characteristics that are chosen should be of a type that can be used to calculate the power dissipated by the processor core processing, an actual workload. As discussed herein these can be architecture level characteristics, but do not have to be limited to such. One possible type of such a characteristic is the throughput (IPC) in each unit, as described herein.

Block 420 depicts analyzing, an actual workload. This analysis can be done with a microarchitecture performance simulator or other tool, which will return one or more workload characteristics that represent a processor core's response to the actual workload. Thus, these workload characteristics are called actual workload characteristics. The characteristics that are chosen should be of a type that can be used to calculate the power dissipated by the processor core processing an actual workload, and can be the same as the reference workload characteristics. As discussed herein these can be architecture level characteristics, but do not have to be limited to such. One possible type of such a characteristic is the throughput (IPC) of each unit, as described herein. In an embodiment to of the invention, the characteristics chosen can be the same as the reference workload characteristics.

Block 430 depicts performing a power analysis for the reference test case. This power analysis can be done by a number of means, including systems that perform a detailed power analysis of the gate/circuit level design of the processor core, as described herein. The analysis can be done for one or more processor cores, or on one or more processor cores that have been broken into a number of physical or logical units. The reference power values are recorded for the one or more processors as a whole, the desired units, or a combination thereof. These reference power values can represent, among other values, the dynamic power dissipated by the entire processor core or various units within the processor core itself.

Block 440 depicts estimating the actual workload power. This can be done by relating the reference power to the actual workload characteristic and the reference workload characteristic. One possible method that can be used is multiplying the reference power by the ratio of actual workload characteristic to the reference workload characteristic. This process would be repeated for each physical or logical unit for which a value is desired. Then the leakage power, for one or more processor cores, can be calculated and added to the estimate of the actual workload power.

Figure 5:
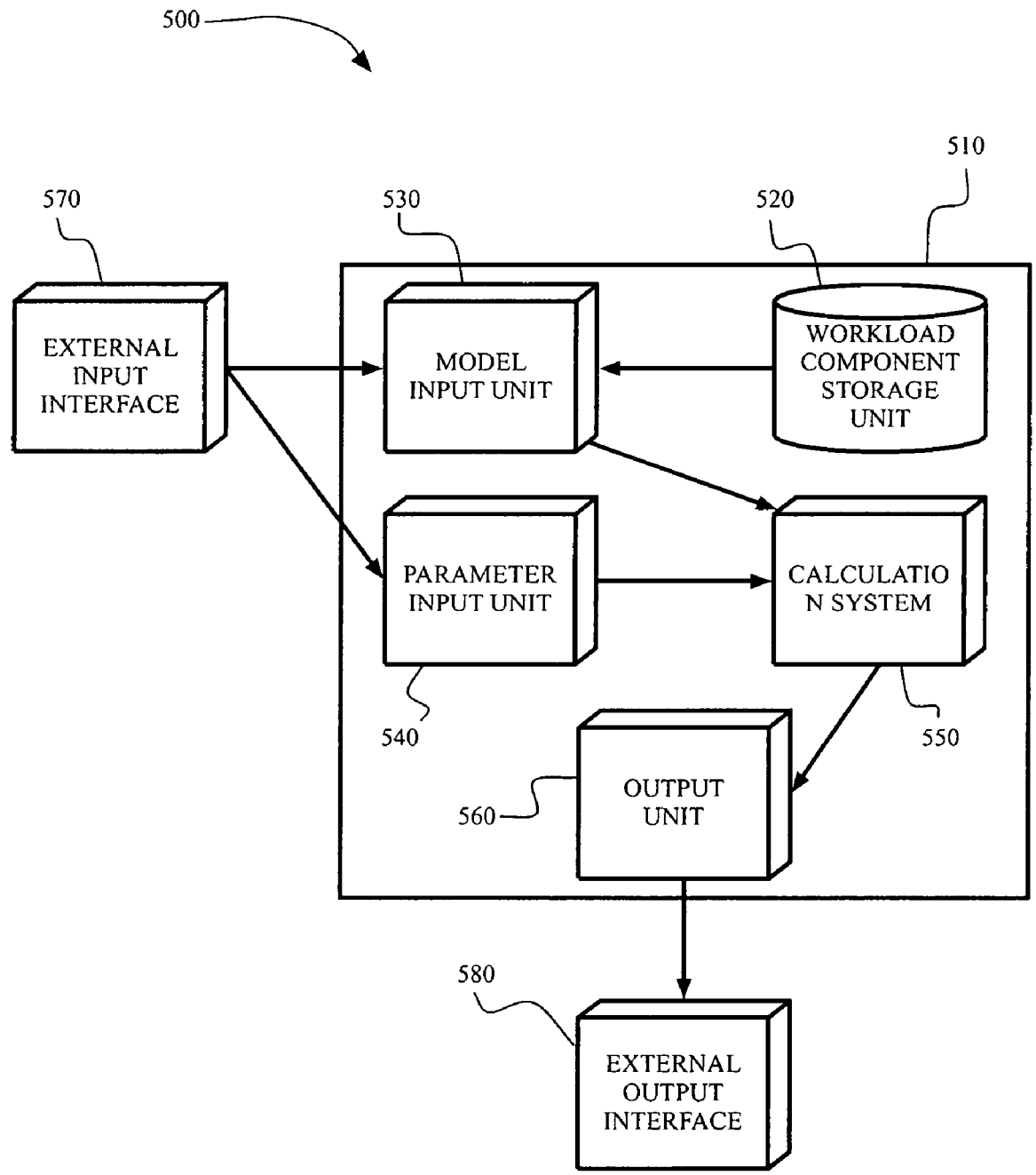
FIG. 5 is a block diagram illustrating an exemplary embodiment of a power estimation system in accordance with the present invention.

FIG. 5 is a schematic diagram that depicts an exemplary embodiment of the present invention, indicated generally by the reference numeral 500. The system 510 is a system for estimating the power dissipated by one or more processor cores, processing an actual workload. The system uses workload components to model workloads. These workload components are selected, modified, and assembled by a user or external system so they model an actual workload. A reference test case is created from this model and used to estimate the dissipated power as described herein.

The Workload Component Storage Unit, WCSU, 520 stores the workload components. Each workload component represents a logical unit of a workload, that when assembled, and modified, together with other workload components can be used to model an actual workload. Stored and associated with each workload component is a reference test case component. These reference test case components will be used to create reference test cases that are representative of the workload being modeled.

The Model Input Unit, MIU 530 allows an individual or other system, via an External Interface 570, to select workload components from the WCSU 520, arrange and connect the workload components, and to modify workload components so they can model an actual workload. The MIU 530 also has a component, not depicted, that takes the reference test case components stored in the WCSU 520 and creates a reference test case based on the model of the actual workload. This reference test case will be used, as described herein, to help calculate the power dissipated by a processor core.

Block 540 depicts a Parameter Input Unit (PIU) that allows an individual or other system, via an External Interface 570, to input operating parameters and operating conditions for a processor core and all actual workload. These will be used later for the power calculations, and can include the processor core operating voltage and frequency.

Block 570 depicts an External Input Interface that is a unit external to the power estimation system 510. It allows an individual or another system to interface with the power estimation system 510 via the MIU 530 and the PIU 540. It can take the form of a keyboard, a mouse, a piece of software that allows another system to interface with the Power Estimation System 510, or some other form not listed.

Block 550 is the Calculation System. It takes the reference test case from the MIU and the parameters from the PIU and estimates the desired power values, using the methods described herein, which it sends to the Output Unit 560. The output unit 560 formats the output and sends it to the External Output Interface 580. The External Output Interface can take the form of a computer monitor, a software interface to an external system, or anything that will allow an individual or another system access to the output.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It should also be understood that the above description is only representative of illustrative embodiments. For the convenience of the reader, the above description has focused on a representative sample of possible embodiments, that are illustrative of the principles of the invention, and has not attempted to exhaustively enumerate all possible variations. That alternative embodiments may not have been presented for a specific portion of the invention is not to be considered a disclaimer of those alternate embodiments. Other applications and embodiments can be straightforwardly implemented without departing from the spirit and scope of the present invention. It is therefore intended, that the invention not be limited to the specifically described embodiments, but the invention is to be defined in accordance with that claims that follow. It can be appreciated that many of those undescribed embodiments are within the literal scope of the following claims, and that others are equivalent.

What is claimed is:

1. A system for estimating power dissipated by a processor core, processing a workload, comprising:
   a workload component storage unit ("WCSU"), for storing a workload component capable of modeling at least part of a workload, wherein the WCSU is associated with a reference test case component;
   a model input unit allowing for choosing and connecting of a plurality of the workload components stored in the WCSU, for modeling of an actual workload, wherein the model input unit further comprises a unit for creating a new reference test case indicative of the actual workload by linking the reference test case components based on a selection and connection of the workload components in the model;
   a calculation system for estimating an actual workload power dissipation value, wherein the calculation system estimates the actual workload power dissipation value by implementing a method comprising:
      analyzing the new reference test case to generate a new reference workload characteristic;
      analyzing the actual workload to generate an actual workload characteristic;
      performing a power analysis for the new reference test case to establish a reference power dissipation value; and
      estimating the actual workload power dissipation value responsive to the actual and new reference workload characteristic and the reference power dissipation value; and
   an output unit for sending the estimated actual workload power dissipation value to an external system.

2. A system as defined in claim 1 further comprises a parameter input unit for the input of an operating parameter for a processor core.

3. A system as defined in claim 1 further comprises a parameter input unit for the input of an operating parameter for the actual workload.

4. A system as defined in claim 1, wherein the step of estimating the actual workload power dissipation value further comprises scaling the reference power dissipation value by the ratio of the actual workload characteristic to the reference workload characteristic.

* * * * *